United States Patent [19]
Donaldson

[11] 3,721,309
[45] March 20, 1973

[54] SPEED CONTROL SYSTEM FOR MOTOR VEHICLES

[76] Inventor: Fred A. Donaldson, 2068 South Street, Blair, Nebr.

[22] Filed: July 13, 1970

[21] Appl. No.: 54,424

[52] U.S. Cl. ............... 180/105 R, 74/513, 123/97 R, 116/114
[51] Int. Cl. ............................................. B60k 31/00
[58] Field of Search ...... 180/105, 106, 107, 108, 109, 180/110; 123/97, 98; 74/513, 526

[56] References Cited

UNITED STATES PATENTS

| | | | |
|---|---|---|---|
| 2,822,881 | 2/1958 | Treharne | 180/110 |
| 2,972,390 | 2/1961 | Bunker et al. | 123/97 X |
| 3,518,960 | 7/1970 | Donaldson | 116/114 |

*Primary Examiner*—Leo Friaglia
*Assistant Examiner*—John P. Silverstrim
*Attorney*—Hiram A. Sturges

[57] ABSTRACT

A speed control system for a motor vehicle comprising in combination; a governor system to limit the speed of the vehicle, the governor system being responsive to rotation preferably at the transmission, the governed speed of travel being pre-settable, and an overcomable high speed deterrant assembly comprising a high resistance spring urging the accelerator pedal toward lower speed positions only at times when the vehicle is exceeding the governed speed, and the high speed deterrant assembly being correlated with the governor for safety by permitting speeds free of extra deterrant forces on the accelerator pedal up to a maximum governor controlled vehicle speed which latter can be exceeded temporarily in emergency by further accelerator pedal depression for over-riding the governor.

5 Claims, 9 Drawing Figures

INVENTOR.
FRED A. DONALDSON

SPEED CONTROL SYSTEM FOR MOTOR VEHICLES

FIELD OF THE INVENTION

This invention is in the field of mechanical devices attached to motor vehicles for assisting both drivers and law enforcement authorities to govern the speeds thereof.

DESCRIPTION OF THE PRIOR ART

The simple governor systems set a top speed to which the vehicle is limited, but such simple governor systems have not been widely used because they limit top speed that cannot be exceeded in emergency. During passing, it is important to be able to get back out of the left lane quickly before a head-on collision, and lack of available extra speed, above a governor-set top speed, can be sudden death.

I refer to automatic crusing speed maintenance systems as "robot systems." The "robot" types of governor systems are liked by many because the driver can take his foot off of the accelerator pedal and yet the robot system will cause his automobile to maintain its set speed uphill or down, doing so whether the driver is awake or asleep.

Monotonous straight super-highways cause sleepiness and cause many drivers to go off into the ditch and some to cross the median into a head-on collision. "Robot" governor systems have added to this hazard.

The "robot" types of governor systems have been under attack from safety experts because with "robot" systems, constant thought about accelerator control of the car is not necessary to maintain speed and so many "robot" system users tend to go to sleep from boredom due to a lack of need to be alert for thinking about and maintaining a desired speed.

To shut off a "robot" system for causing a car to slow down, a driver must first take the step of pressing the brake to regain rule of the speed of the car back from the "robot" system, or he will go at high speed until he either (1) crashes, or (2) is fortunate enough for his "robot" system to be deactivated by a device responsive to travel over rough terrain.

A person suddenly crippled by fainting, heart attack, or stroke sometimes has the physical incapacity for pressing the brake to shut off a "robot" system.

A car with a conventional accelerator system, if driven by a suddenly incapacitated person, is safer than with a "robot" system because the conventional car would gradually decelerate.

It is important that as a car goes uphill and a governor gives the engine more gas in order to maintain the set speed, that the foot pedal not depress even without a conscious effort from the driver as a result of the resistance to foot pedal depression and because the operator has his foot on the accelerator, because the foot pedal pulsation that results from this is an irritating nuisance.

The reason this irritating pulsation is a nuisance is because it is the custom of a driver to experience substantially no motion in his accelerator pedal in an ordinary car at times when he is going at a single speed under constant road and wind conditions, and so — since he is wanting a continuous speed from his speed control system, and is getting it, he is irritated at not experiencing the same sensation he is accustomed to experience in his accelerator pedal under the condition of constant speed in an ordinary car of his past experience.

SUMMARY OF THE INVENTION

A speed control system for a motor vehicle comprising in combination: a governor system to limit the speed of the vehicle, the governor system being responsive to rotation preferably at the transmission, the governed speed of travel being pre-settable, and an overcomable high speed deterrant assembly comprising a high resistance spring urging the accelerator pedal toward lower speed positions only at times when the vehicle is exceeding the governed speed, and the high speed deterrant assembly being correlated with the governor for safety by permitting speeds free of extra deterrant forces on the accelerator pedal up to a maximum governor controlled vehicle speed which latter can be exceeded temporarily in emergency by further accelerator pedal depression for over-riding the governor.

The speed control system described in which the governor system has a trackway adjacent the fuel flow control member, a track follower in the trackway and slidable with respect to the trackway in directions corresponding to each of the two directions of movement of the fuel control member, the governor system having means connecting the track follower and the fuel flow control member, the governor system having pressure means exerting continual pressure on the track follower to urge it in one direction, the governor system having a cable attached to the track follower to urge it in an opposite direction, the movable linkage means being connected to the trackway means, the trackway means being so constructed that at times when the vehicle is travelling at the governed speed, the trackway means will prevent the track follower from moving in the direction the track follower is pressed by the pressure means beyond a point of control of the fuel flow control member by the track follower, at which point, there is still room for the accelerator pedal to move in a speed increasing direction sufficient for attaining speeds beyond the governed speed for emergency use.

The system described in which two magnetically attracted members are positioned so as to be movable toward and away from each other, means for guiding the magnetically attracted members during such movement, means operably correlating the magnetically attracted members with the spring means so that as the spring means begins to gradually urge the pedal with the deterrent force, the magnetically attracted members will move gradually apart for adding a magnetic attraction force to an initial deterrent force of the spring.

The system described in which a manually controllable governed speed adjusting device is mounted adjacent a driver's position on the vehicle and is operably correlated with the governor means for the manual setting of that vehicle speed which is desired by the driver of the vehicle to be the governed speed, the manually controllable governed speed adjusting device serving to define the pre-setting means.

The system described in which the pre-setting means is further defined by a pre-setting means located out of reach of a driver in the driver's position and which sets a top limit for the governed speed which cannot be exceeded by operation of the manual speed adjusting device.

The speed control system described in which the governed speed pre-setting means is permanently fixed in a manner such that it cannot be adjusted by the driver of the vehicle while driving so as to be set for a speed beyond the speed for which it is fixed.

A particular object is to provide a speed control system which will limit vehicle speed by means of a governor, yet eliminating the disadvantages of the governor systems of the prior art by permitting the governor speed to be exceeded in an emergency and yet provide a deterrent to operation at speeds in excess of the governed speed.

An important object is to provide a speed deterrent and control system in which the foot pedal will remain stationary even while the governor is giving the engine more, or less, gas; this feature desirably giving the operator the same feeling of a consistency of speed that he would have in an ordinary car system when the car is traveling on perfectly level pavement, with no changes in natural wind force, namely, that when he holds the pedal in one position, he experiences a constant speed on level ground, without wind changes.

Since it is the custom of a driver to experience substantially no motion in his accelerator pedal in an ordinary car at times when he is going at a single speed under constant road and wind conditions, and so — since he is wanting a continuous speed from his speed control system, and is getting it, the driver will also find pleasure in having the same sensation he is accustomed to experience in his accelerator pedal under the condition of constant speed in an ordinary car of his past experience.

DESCRIPTION OF THE PREFERRED EMBODIMENT

The speed control system of this invention is generally indicated at 10 and, as one of its parts, has a high speed deterrent assembly 20, and as another of its parts, uses any one of many conventional pedal systems, one of which is illustrated generally at 30 having a control arm 40 which is pivotally attached by a means 42 to a bracket 44 which is mounted on the passenger side 50 of a fire wall 46.

The engine side of the fire wall is indicated at 52.

The lever arm 40 has an upper portion 58 which is straight, but which is disposed at an obtuse angle to its lower portion 60.

A conventional foot pedal 70 has a bracket 72 on its forward side which is pivotally attached by means 74 to a lower end of the portion 60 of the arm 40.

At the upper end of the arm portion 58, the rearward end of a pull rod or pull member 90 is pivotally attached to an opening 92 in the arm portion 58.

In accordance with this invention, a high speed deterrent spring is generally shown at 100. It is a compression spring disposed around a rod 102 which extends slidably through the fire wall 46. The fire wall end of the spring 100 engages a plate 110 secured to the fire wall by bolts 112, the forward end of the spring 100 engaging a spring retaining member or magnet 120 suitably secured to the forward end of the rod 102.

The rearward end of the rod 102 is attached to a forward end of a chain 130, the rearward end of which is secured to an opening 140 in the arm portion 58 so that when the pedal 70 is depressed forwardly, the arm portion 58 will move rearwardly pulling on the chain 130 and drawing the rod 102 rearwardly through the fire wall compressing the spring 100.

Figures 1, 2, 3:
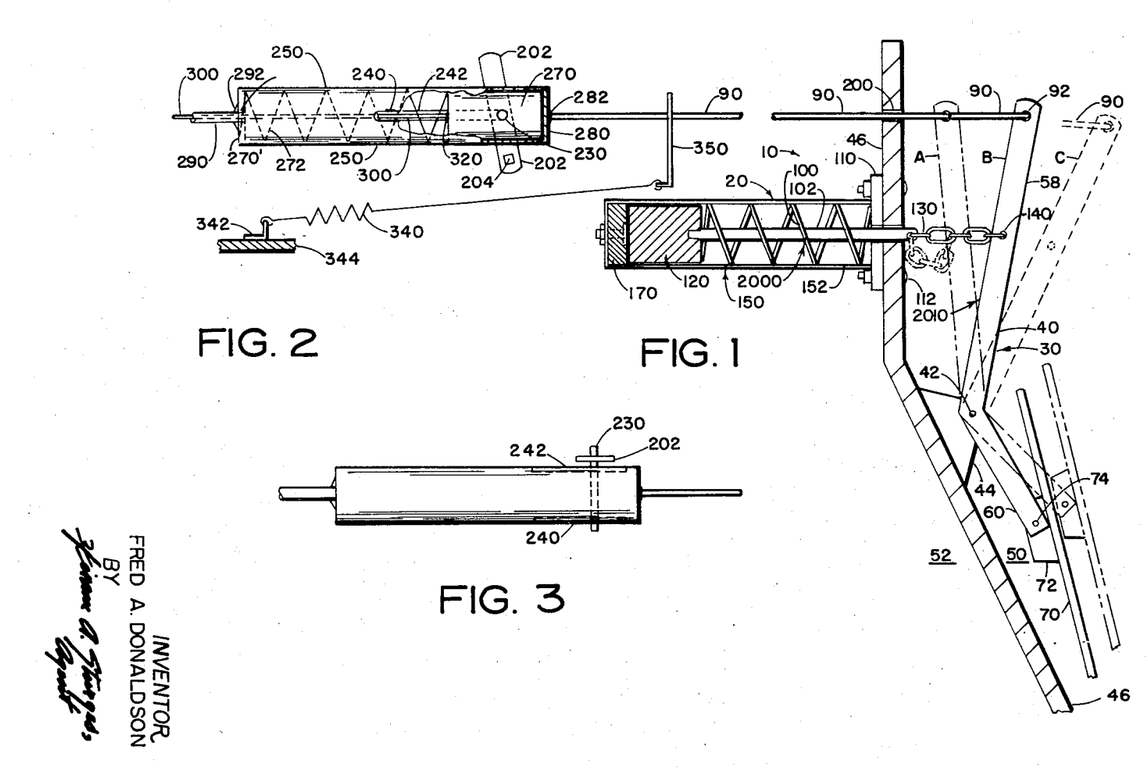
FIG. 1 is a sectional view taken in a vertical plane extending from forward to rearward through the accelerator pedal and fire wall area of an automobile, and showing in dotted lines various positions of the foot pedal and linkage means.
FIG. 2 is a side elevation of a trackway portion of a governing system, showing a portion of the governing system as attached to the throttle control arm of the vehicle, a portion of the track member being broken away to show the interior, and a broken away portion of the engine being shown in section.
FIG. 3 is a top plan view of the trackway portion of the governing system and throttle control arm.

However, it is to be understood that the spring 100 will not be compressed except at times when the foot pedal 70 has been depressed to an extent such that the arm portion 58 has reached a position B shown in FIG. 1, which position is intermediate to arm positions A and C.

As the arm 58 moves from position B to position C, the deterrent spring 100 is compressed more and more, increasing resistance to the pressing of the foot pedal by the operator to the extent that this resistance is so substantial that the operator will find it considerably easier and substantially more comfortable to allow the foot pedal to remain more upward than in a position such that the deterrent spring 100 is compressed.

However, it is to be understood that the deterrent spring 100 is of a reasonable strength, not so great as to provide a safety hazard in periods when it is important that the operator depress the foot pedal with substantial extra effort to gain speed required in an emergency situation such as in passing another vehicle.

Such "extra speed" is defined as a speed which is beyond the governed speed of the engine as regulated by a governor system later described herein.

The strength of the spring 100 provides a certain desirable amount of deterrance to the attaining of speeds beyond the governing speed. The over-all effect of the total system weighs heavily in favor of increased safety because the total system has as its purpose to provide a vehicle which can be governor-regulated even by law to a limit speed and which, nevertheless has possibilities of being operated in emergency at speeds beyond its governed speed.

Referring again to FIG. 1, it will be seen that the spring 100 is surrounded by a housing 150 which is fixed to the base 110 and which has a cylindrical inner wall 152 slidably receiving therein a spring-engaging member 120.

In the housing 150 and attached to the housing 150, disposed on the forward side of the member 120 but separate therefrom, is a magnetically cooperating member 170, which latter is adapted to be abutted on its rearward by the forward side of the member 120. In a sense, the member 120 can also be called a magnetically cooperating member 120. It is important that one of the members 120 or 170 be a magnet and the other of the two members be formed of magnetically attracted material.

As thus described, it will be seen that as the foot pedal is depressed to the point that the arm portion 58 has reached the position B in FIGS. 1 and 2, the magnetically cooperating members 120 and 170 will break away from one another upon further foot pedal depression.

But before the two members 120 and 170 break away from one another, they will tend to form, by their mutual attraction, a special resistance to depression of the foot pedal 70 beyond the point B. In this way, the magnetically cooperating members 120 and 170 tend to support the foot pedal 70 making it easy for the operator to allow the foot pedal to remain in the position corresponding to arm position B, as is desirable since the object of the invention is to influence the driver toward normally maintaining the foot pedal in a position such that it does not cause vehicle speeds in excess of the governed speed.

It is well known that springs such as the deterrent spring 100 offer greater resistance after they are somewhat depressed than they do at the beginning of depression. Since this is the case, the spring 100 would not provide as great a resistance at the beginning of its compression as it would after its compression is progressed, and it is an object of this invention to make use of the magnetically cooperating members 120 and 170 to provide an increased resistance to foot pedal depression beyond the foot pedal position corresponding to the governed speed.

In this way, the magnetically cooperating members tend to provide an increased resistance to foot pedal depression at that desirable time when the spring is beginning to be compressed so that the magnetic attraction substitutes by its resistance to foot pedal depression for some of the resistance that is not yet built up in the spring because it is not yet compressed. The magnetically cooperating members in this way eliminate some of the sponginess, or lesser resistance, that a spring exhibits at the beginning of its compression.

If it is desired to eliminate the magnetically cooperating members 120 and 170, then in substitution of the magnetism effect just mentioned, the spring 100 could be disposed in the system at a compression, that is, at a considerable compression, even at times when the member 120 is used merely as a spring-retaining member and the lever arm portion 58 is in the position A. With such a construction, as soon as the arm portion 58 has reached the position B, the spring 100 will start to further compress, and since the spring 100 will already have been compressed a considerable amount, the operator will experience an immediate and substantial resistance to further foot pedal depression from the spring alone when magnetism is not used.

Referring to FIGS. 1 and 2, the forward end of the rod 90 will there be seen to extend on through an opening 200 in the fire wall 46 until it extends forward to the vicinity of the carburetor butterfly valve control or throttle arm 202 which pivots about a horizontal axis 204 extending from right to left with respect to the car.

As best seen in FIG. 3 a connecting pin 230 is there shown and it is attached to an upper portion of the throttle arm 202 and extends horizontally through slots 240 and 242 in the right and left hand sides of a track 250.

The slots 240 and 242 are disposed in registry so that if seen from a right side, for example, both will be on the same level and of the same length, each slot being horizontally elongated from forward to rearward of a forward-to-rearwardly extending elongated track member 250, which latter has in it a spring pressure receiving member 270 which is adapted to slide back and forth in the track 250, the receiving member 270 having the pin 230 extending horizontally therethrough from right to left. The track member 250 has a forward end 270' against which a compression spring 272 presses, the rearward end of the compression spring pressing against the spring pressure receiving member 270 for forcing it rearwardly with a continual urging.

The rearward end wall 280 of the track 250 is welded at 282 to the forward end of the rod 90 which is controlled by the accelerator pedal.

At the forward end of the track 250 a cable sheath 290 is bonded at 292, only a portion of the cable sheath being shown in FIG. 2, the sheath having in it a cable 300 which extends through the sheath and also through an opening 310 in the forward wall 270' and from there extends through the track 250, being connected at 320 to the forward side of the spring pressure receiving member 270 whereby movements of the cable 300 tend to control the position of the connecting pin 230 relative to the position of the track 250.

The pull rod 90 is pulled forwardly by a pull rod spring 340, seen in FIG. 2 to be attached by means 342 to any stationary part of the vehicle such as a portion of the engine 344.

The rearward end of the spring 340 is connected to a bracket 350 which is fixed to the pull rod so that the pull rod is continually urged forwardly.

It will be seen that the pull rod 90 need not be a pull rod but can instead be a flexible cable, whereby the member 90 could perhaps be best called a pull member 90.

Figure 4:
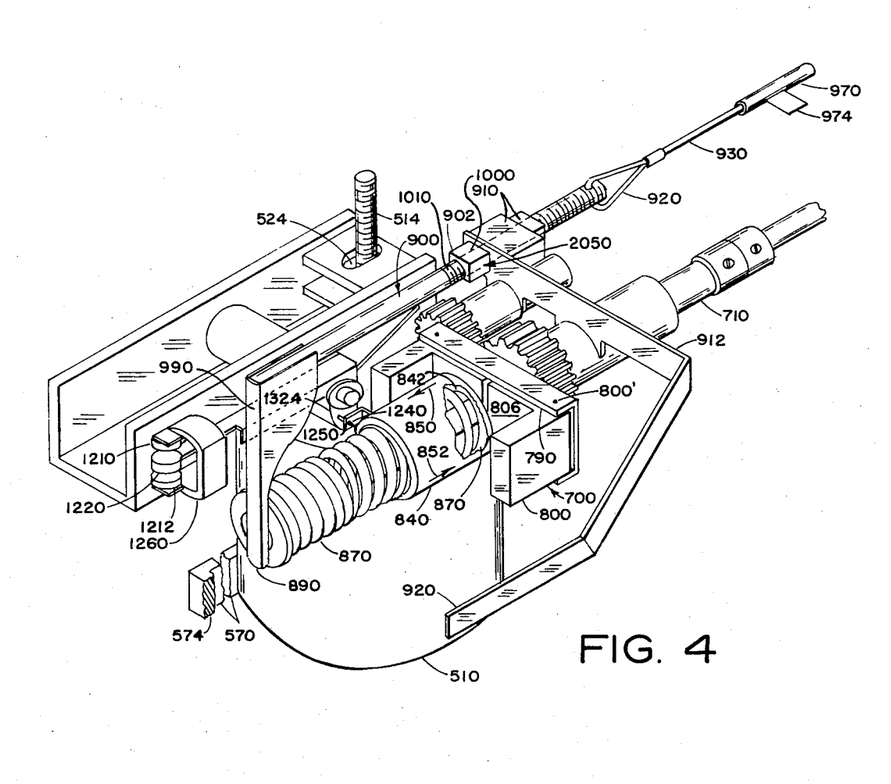
FIG. 4 is a perspective view of a governor system of the prior art which can be used with the speed control system of this invention, a portion of one of the parts thereof, called the slider, being broken away for showing its interior.
Figure 5:
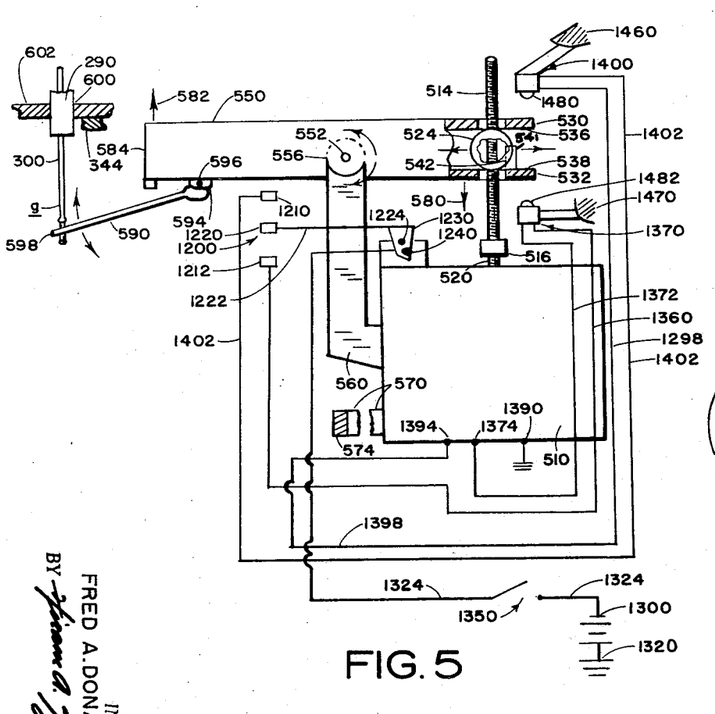
FIG. 5 is a wiring diagram for the governor of FIG. 4 with portions broken away for showing other portions in section, and portions of an automobile being shown in section.

Referring now to FIG. 4, the governor system is there generally indicated at 500, and it will be seen that the track 250, its contained parts, the connecting pin 230, and the cable 300 and sheath 290, all form parts of the governor system 500, certain parts of the governor system directly associated with the cable 300 being shown in FIG. 5.

In FIGS. 4 and 5, a governor motor is shown at 510 provided with a threaded shaft 514 suitably attached at 516 to the drive shaft 520 of the motor, the threaded shaft 514 extending vertically in the illustration shown in FIG. 5 through a vertical threaded opening in a ball 524, which latter is disposed between upper and lower plates 530 and 532 which are spaced apart and closely disposed to the ball 524.

The plates 530 and 532 each have a slot 536 and 538 respectively through the respective plate, the slots slidably receiving the shaft 514 therethrough so that the shaft 514 is free to move, within the limits of the walls of the slots 536 and 538, free to move, that is, in a direction lengthwise of a rocker 550 to which they are rigidly attached, the rigid rocker pivoting about an axle 552, which latter is attached to a stationary part of the vehicle indirectly, as is accomplished by attaching the axle 552 rigidly to the rocker 550 but rotatably with respect to the bearing 556, which latter is attached by a bracket 560 to the motor 510, which latter, for convenience of illustration, is attached by a second bracket 570 to a stationary part of the vehicle such as is illustrated by a part 574 which is a part of the outer housing of the engine of the vehicle.

Since the axle 552 is horizontally disposed in the illustration shown, any downward movement of the rearward end of the rocker 550 in the direction of the arrow 580 will cause the forward end of the rocker to move upwardly in the direction of an arrow 582.

On the underside of the forward end 584 of the rocker 550 a hinge bar 590 is pivotally attached to the underside of the rocker by means shown at 594 for the hinging of the rearward end of the bar 590 about an axis 596 which extends parallel to the axle 552 whereby a forward end 598 of the bar 590 is free to move upwardly and downwardly. A movement downwardly of the forward end of the rocker 550 will cause the underside of the forward end of the rocker to press against the upper side of the bar 590 for forcing the entire bar to move downwardly, since the axis 596 is rearwardly of the forward end of the rocker end 584.

In turn, the downward movement of the forward end of the rocker 550 will cause a pulling on the governor cable 300 to which it is attached, whereby the cable 300 will tend to move with respect to its sheath 290, which latter has its governor end anchored to a stationary portion of the car, which latter can be an anchoring by means of a weld 600 to a part of a cover of the governor assembly power unit such part being seen at 602 in FIG. 5, the remainder of the cover of the governor assembly power unit not being shown for convenience of illustration and to reveal the parts therein better. The cover 602 is rigidly attached to some stationary part of the automobile or vehicle such as the vehicle frame or the engine block, only a small broken away portion of which is shown in FIG. 5 for convenience of illustration and numbering.

Figure 6:
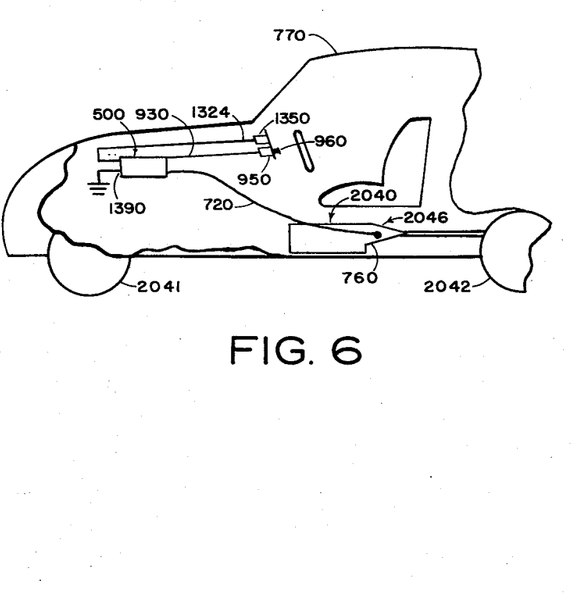
FIG. 6 is a diagrammatic view of the side of an automobile with portions broken away for showing the interior and the positions of the parts of the speed control system of this invention therein.

Referring now to FIG. 4 a fly weight governor is there shown at 700 having a drive shaft 710, which latter, as best seen in FIG. 6, is connected to a flexible cable 720 which is itself connected to the transmission of the automobile 770 in a suitable drivable manner common to governors which are transmission driven and, therefore, not believed to require illustration at this time. The cable 720 from the transmission connects to the shaft 710 and the latter rotates, and as it does so, a fly weight supporting bracket 790 likewise rotates at a speed corresponding to the speed of the transmission.

Fly weights 800 are provided and are pivotally attached or hinged to the fly weight bracket 790 for pivoting about axles 800' which are disposed in parallelism and at a right angle to the drive shaft 710.

Each fly weight 800 has an arm 806 extending at a right angle to its weight 800 and attached to its weight 800, and therefore, pivoting about the respective axles 800', whereby the arms 806 engage an end of a slider 840, which latter is slidably mounted by means of a bearing 842 fixed thereto on the forward end of the shaft 710 so that the slider 840 does not rotate with the shaft 710, but is free to slide with respect to the shaft 710 in the two opposite directions of the arrows 850 and 852.

The slider 840 is urged rearwardly against the arm portions 806 by means of a coiled spring 870 which engages the forward side of the bearing 842 to which the slider 840 is fixed.

The spring 870 has its forward end received in a cap 890, which latter is mounted on a spring control assembly generally indicated at 900 comprising a forward-to-rearwardly extending bar 902, which latter is slidably mounted in a support 910 suitably fixed by a bracket 912 permanently to the vehicle indirectly, such as by being attached to the housing of the motor 510, as shown at 920, since the housing of the motor is defined as earlier described as being fixed to the frame of the automobile indirectly by being fixed to the part 574 of the outer housing of the engine of the vehicle 770.

The sliding bar 902 has its forward end attached at 920 to a cable 930, which latter, as best seen in FIG. 6, extends upwardly to a suitable control mechanism 950 operated by knob 960. The mechanism 950 is the same in construction as the mechanism which is given the title speed regulation assembly or speed setting assembly 174 in my earlier patent application Ser. No. 699,275, filed Nov. 13, 1967, and titled, SPEED MODIFYING AND WARNING DEVICE FOR AUTOMOBILES.

As thus defined, twisting of the knob 960 will cause the cable 930 to be pulled or pushed, depending upon the direction in which the knob is twisted. The cable 930 is received in a sheath 970 which is anchored to a stationary part of the vehicle 770, such part being shown at 974 for convenience of illustration, the other end of the sheath 970 being similarly anchored in the manner of the anchoring of the sheath 142 in in the said earlier patent to the speed setting body portion 170.

When the cable 930 is pulled, the bar 902 is pulled, whereby an extension 990 to which it is attached and which extends at a right angle to the remainder of the bar 902 presses rearwardly on the cap 890 pushing the spring 870 forward and compressing it for placing a greater amount of pressure against the bearing 842 for urging the slider 840 rearwardly in the direction of the arrow 852 with a greater force as will have the effect of nullifying some of the effect of increased speed of the vehicle, or in other words, working against some of the effect of the force of the fly weights for urging the slider in the direction of the arrow 850.

Thus the effect of controlling at the knob 960 for pulling the cable 930 causes higher speeds to have the same governoring effect as otherwise would be the case at lower speeds if the cable 930 was not regulatable.

It is desirable that the governed speed have an upper limit, perhaps set by law, this upper limit being overridable in emergency, as later mentioned.

The bar 902 can be provided with an adjacent nut 1000 movable along threads 1010, the nut being engageable with an adjacent side of a bracket 912 earlier described so that it is not possible for the operator of the car to cause the cable 930 to be pulled to an extent beyond the position at which the nut 1000 engages the bracket 912. In this way, the position of the nut 1000 along the bar 902 will set a top governed speed, which latter is all overcomable in emergency, as made possible by other later described features of this invention.

In FIG. 4 a switch is generally indicated at 1200 and has two fixed contacts 1210 and 1212 having disposed therebetween a moving contact 1220 mounted on a swinging arm 1222 pivoted on an axle 1224.

An extension 1230 extends away from and is attached to the arm 1222 and has thereon a pivot pin 1240, best seen in FIG. 5 and also in FIG. 4, and referring to FIG. 5 the pin 1240 extending pivotally horizontally through an opening in a tab 1250, which latter is attached to the slider 840, the pin 1240 being disposed in parallelism with the axle 1224. As thus described, when the slider 840 moves in the direction of the arrow 850, the switch arm 1222 will move upwardly placing the contact 1220 in touch with the stationary contact 1210, and movements of the slider 840, as seen in FIG. 4, in the direction of the arrow 852 will cause downward movement of the contact 1220, whereby it touches the lower stationary contact 1212.

As best seen in FIG. 4, and FIG. 5 the stationary contacts 1210 and 1212 are attached to an electrically insulative contact support 1260, which latter support is fixed to a switch contact support bracket 1266 which is suitably attached to an outer side of the motor 510, as seen in FIG. 4.

As best seen in FIG. 5, the electrical system of the vehicle 770 is represented by a battery 1300, one terminal of which is grounded 1320 and the other terminal of which is connected to a wire 1324, which latter is connected to the extension 1230 for placing the wire 1324 in effective electrical contact with the movable contact 1220.

In the wire 1324 is the ignition switch 1350 of the vehicle.

In this way, the motor 510 and the electrical system which supplies it are not always activated, but only when the ignition switch is on.

At times, the moving contact 1220 is in contact with the lower contact 1212, which latter is connected by a wire 1360 to a switch 1370, the other terminal of the switch 1370 being connected by a wire 1372 to the motor 510, the motor 510 being reversible, the second terminal 1390 of the motor being grounded and a third terminal 1394 of the motor 510 being attached by a wire 1398 to a switch 1400, the other terminal of the limit switch 1400 being connected by a wire 1402 to the upper stationary switch contact 1210.

The switches 1370 and 1400 are limit switches having housings suitably secured to stationary parts 1460 and 1470 of the vehicle, whereby each limit switch has a movable button 1480 and 1482 for the switches 1400 and 1370 respectively, the button 1480 being disposed above and facing an upper plate 530 of the rocker 550. The button 1482 faces upwardly below and is engageable by the plate 532 of the rocker 550, whereby as the rocker 550 swings up and down, its plates 530 and 532 will respectively engage the buttons 1480 and 1482 for respectively opening the switches 1400 and 1370.

As thus described, the cable 300 is controlled by the rocker 550, which latter is controlled by the reversible motor 510 within limits set by the switch 1400 and 1370, the motor being caused to rotate in one direction or another by the closing of the movable contact 1220 with contacts 1210 or 1212.

The closing of the switch 1200 in one direction or the other is itself caused by the fly weight governor system 700 as influenced by the speed of the car and also by the setting of the cable 930 by the knob 960 on the dash at the driver's discretion below the limit of the top governed speed, which latter is preferably set by law and determined by the position of the nut 1000, as can be more permanently set by a spot-weld 2000 fixing the nut 1000 to the bar 902 in a location set probably at the factory when the vehicle is made.

It is important that the setting be made in conjunction with the vehicle itself, as it is not determined by the governor system alone, but also in proportion with the characteristics of the vehicle.

The top governed speed set by law can be carried out into practical effect if the nut 1000 and the support 910 are placed inside a special cover which could, for example, be sealed such as by means of a governmental seal of a sort the breakage of which could be detected by inspection if any tampering with the position of the nut 1000 was attempted.

Figure 7:
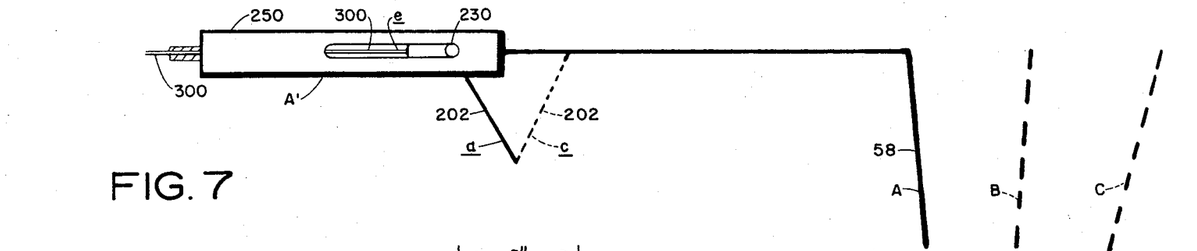
FIG. 7 is a diagram showing the position of parts of the speed control system at the time the accelerator pedal is in an upward position.

In FIG. 7, a diagrammatic position of the upper arm portion 58 is shown in full lines in which the position labeled A indicates a forward position of the upper arm portion 58 in which the foot pedal 70 has not been depressed at all so that it serves for indicating the positions of certain parts at times when the automobile engine is idling but the automobile is motionless with its foot pedal 70 not depressed.

With the arm 58 in position A, the pull rod 90 is in its farthest forward position, and thereby holds the track 250 in its farthest forward position A', all as illustrated in FIG. 7. The non-depressed position of pedal 70 causes the pull rod 90 to be as far forward as possible because the spring 340 urges it forward, as best seen in FIG. 2.

In FIG. 7, the position of the throttle arm 202 when the engine is idling and the car is motionless as shown at a. The position a is the farthest forward position the throttle arm 202 ever assumes.

In FIG. 7, the cable 300 has its throttle end e as far rearward in the automobile 770 as the cable 300 will go.

The reason the cable 300 has its throttle end e as far rearward as it will go in the position shown in FIG. 7 is best seen by looking at FIG. 5 and realizing that this is at a time when the governor end g of the cable 300 is the closest to the adjacent end of the sheath 290 because the rocker arm 550 has its forward end 584 in an uppermost position with the forward end 598 of the hinged bar 590 in its uppermost position with respect to the rocker arm 550, all because the spring 272, as seen in FIG. 2, urges the cable 300 rearwardly in the vehicle 770 at its throttle end e and because the governor system 500 is causing the forward end 584 of the rocker arm 550 to be in the uppermost position.

The forward end 584 of the rocker arm 550 will always be in the uppermost position whenever the automobile has been stopped.

It is helpful to remember that the governor system 500 is always in operation whenever the engine is running, or in another sense, whenever the ignition is on.

In FIG. 7, the position a of the throttle arm 202 is at the forwardmost position, which is its position for throttle valve in idling position and minimum air and fuel flow to the engine.

Figure 8:
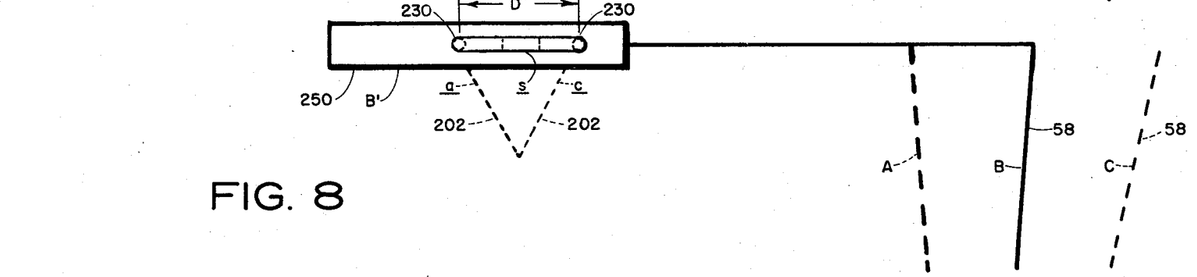
FIG. 8 is a diagram of parts of the speed control system at times when the accelerator pedal is an intermediate position.

As the foot pedal is depressed, the upper arm 58 can move to the B position shown in FIG. 8, although if car speed is less than the said governed speed, the arm portion 58 will be at some position between the A and B positions.

However, when the arm portion 58 is in the B position, as shown in FIG. 8, the pull rod 190 will be in a half-rearward position causing the track 250 to be in a half-rearward position.

While the track 250 is in the position shown at B' in FIG. 8, then the throttle arm 202 can, nevertheless, be in an *a* position or the *c* position or positions therebetween, all depending on factors that will now be explained.

Referring to FIG. 8, at speeds below the governed speed, when the arm 58 is in the B position and the track is in the half-rearward or middle or B' position, the throttle arm 202 moves simultaneously with the track until the arm 202 is in position c and the arm 202 will maintain this position c until the governed speed is attained.

After the governed speed is attained, and the vehicle starts down hill sharply, whereby less fuel is required by the governor to maintain governed speed, then the throttle arm 202 will be maintained in the forward idling position a, that is, maintained in that position a by the governor system 500, all assuming the car is going very sharply down hill.

When the vehicle is going sharply up hill, and needs fuel to maintain governed speed, the governor system 500 will maintain the throttle arm 202 in the maximum fuel position c.

As many vehicles have passing gears, it should be explained that at some point just before full throttle position, the passing gear will be activated (c is not really the full throttle position, but it is a near position, which latter is near, but just short of, the full throttle position). When the arm is in the near position c, the passing gear will not be activated.

Still referring to FIG. 8, it is to be observed that with the lever arm portion 58 in the B position and the track 250 in the B' position, the throttle arm 202 will vary between the positions a and c depending upon the engine load, the engine load varying with the inclination of the highway and with headwinds. The majority of the time, the throttle arm 202 would not be in the extreme positions a or c, but pulsating back and forth between positions a and c.

Figure 9:
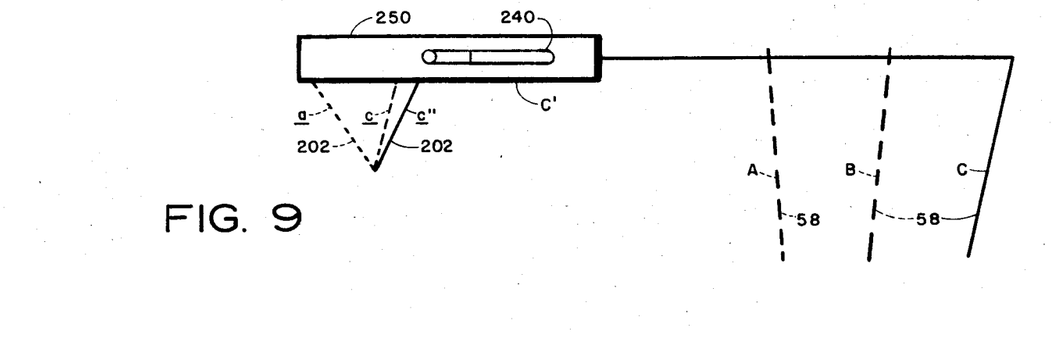
FIG. 9 is a diagrammatic view showing parts of the speed control system at times when the accelerator pedal is in a further depressed position.

Referring now to FIG. 9, when the accelerator pedal has been pushed down to the extreme limit so that the lever arm portion 58 is in the C position, then the track 250 will be in the C' position and the throttle arm 202 will always be in the c'' position with the connecting pin 230 at the extreme forward end of the slots 240.

In FIG. 9, the a position of the throttle arm 202 is shown, but not because the arm is ever in that position while the lever arm portion 58 is in the C position, but being shown only to illustrate the relative position of the arm 202 at c as compared with the a position in which it is located at some other times.

The same statement can be made for FIG. 7 also in that the position c of the arm 202 in FIG. 7 is never attained at times when the lever arm portion 58 is in the A position, but it is shown only for illustration.

In FIG. 9, the throttle arm position c'' is not the position c, which latter is the *near*-full-throttle position, but the position C'' *is the actual*-full-throttle position itself.

It is only when the lever arm portion 58 is in the C position and the track 250 is in the C' position that the throttle arm 202 is ever in the C'' *position shown in FIG. 9.*

The accelerator lever arm portion 58 will ordinarily be disposed between the positions A and B, varying between these two positions as the operator selects speeds in accordance with the traffic conditions he finds.

The lever arm portion 58 is in the position C only at times for passing at speeds beyond governed speed, the latter being indicated at speeds beyond the governed speed position B.

The lever arm portion 58 will seldom be moving between the positions B and C, and when it is, will usually move quickly from the position B to C as the driver responds to an emergency need for speed as for example, in passing.

Referring to FIG. 1, it will be seen that as the lever arm portion 58 moves from the position A to the position B, the chain 130 will move from slack to taut so that once it is taut at the B position, the magnet 120 will break away from its keeper 170 as the lever arm portion 58 moves further backward than the position B.

When the lever arm portion 58 is in the position B, this sets up the condition shown in FIG. 8 in which the throttle lever 202 can vary between the a and b positions, subject to control of the governor system 500.

It is extremely important for the understanding of the invention that the B position of the lever arm portion 58 be understood to be the governed speed position of the lever arm portion 58, regardless of what speed has been set by the operator at the knob 960 of the control mechanism 950, which latter controls the position of the spring control assembly 900 of the governor as earlier described.

It makes no difference what the speed of the governor setting is at the knob 960 of FIG. 6 because the range of throttle arm position between position and position c'' in FIG. 8 *will be the range of variation regardless of selected governed speed.*

Referring to FIG. 1, it will be seen that because of slack in the chain 130, the high speed deterrent compression spring 100 does not have a deterrent effect on accelerator pedal depression until the lever arm portion 58 is in the governed speed position B.

Likewise, because of the slack in the chain 130, the deterrent effect to accelerator depression of the magnetically cooperating members 170 and 120 and the deterrent spring 100 does not happen until the chain 130 becomes taut and the lever arm portion 58 is exceeding the B position which is the governed speed position.

Therefore, if the operator desires to temporarily exceed the maximum govefned speed position, he can do so by further pressing on the accelerator pedal 70 so that the lever arm portion 58 position B is passed, causing the chain 130 to pull the spring engaging member or magnet 120 away from the other magnetically cooperating member or keeper 170 which requires a substantial foot pedal depressing effort on the part of the operator to overcome the magnetic attraction for it and the considerable additional force of the compression spring 100, which latter also must be overcome at the same time.

The force of the compression spring 100, assisted in the early stages of spring depression by the magnetically cooperating members 120 and 170 form such a substantial force as to make it uncomfortable for the operator to long maintain the foot pedal 70 depressed beyond the governed speed position as represented by the position B of the lever arm portion 58.

In this way, substantial deterrent forces are provided for influencing drivers to use speeds which are not above the governed speed, yet allowing the governed speed to be exceeded temporarily in emergency by extra foot pedal depression effort for over-riding the governor. Thus extra effort must be extreme effort, as cannot be over-emphasized because if too little effort were needed, then drivers might simply cruise at speeds beyond the governed speed position defeating the purpose of the governor.

The above terminology is expanded in a more broad way in the following description to correlate with the claims hereinafter. The throttle arm 202 can also be called a fuel flow control member of the motor vehicle which is movable in each of two directions, forwardly and rearwardly at its upper end, for decreasing and increasing flow of fuel to the engine and, therefore, known as a throttle arm or fuel flow control member 202.

The spring 100 can be referred to as a high resistance spring means 100 and the rod 102; and the spring engaging magnetic member 120 form a spring means connection means generally indicated at 2000 connecting the spring means 100 to a pedal and linkage assembly generally indicated at 2010, which latter comprises the pedal 70, the lever arm 40 with its bracket 44, and the pull rod 90, the chain 130 itself also forming a part of the spring means connecting means 2000.

The motor vehicle 770 is of a four-wheeled type for illustration and can be considered to have a drive and wheel assembly generally indicated at 2040 which comprises the vehicle-supporting wheels such as the front wheels 2041 and the rear wheels of the vehicle, shown at 2042, which latter are drivably connected by conventional means not shown to the transmission 760, the transmission 760 forming a portion of a transmission means 2046, which latter drivably connects the engine to the rear wheels 2042 in a conventional manner and, therefore, not completely shown.

The governor system 500 has a governed speed pre-setting means formed by the nut 1000 and the support 910 which slidably receives the member 902, this pre-setting means, therebefore, being generally indicated at 2050, although another pre-setting means also exists, the latter being a manual type available for operation by the driver at the driver's position in the car and defined by the control mechanism 950 with its knob 960, as seen in FIG. 6.

The vehicle 770 can also be said to have, in the spring 340, a spring or means 340, constantly urging the foot pedal and linkage assembly 2010 to lower speed position.

The spring 272 in FIG. 2 can also be called a pressure means 272 exerting continual pressure on the track follower or spring pressure receiving member 270. The track member 250 can also be called a trackway or track member 250.

The spring 272 can also be called a pressure means 272 exerting continual pressure on the track follower 270 to urge it rearwardly in the one direction of the pull rod 90.

It is to be observed that the trackway 250 is so constructed that at times when the vehicle is traveling at the governed speed, the trackway 250 will prevent the track follower or spring pressure receiving member 270 from moving, in a direction the track follower is pressed by the pressure means or spring 272, beyond a certain point of control of the fuel flow control member or throttle arm 202, at which point, there is still room for the accelerator pedal 70 to move in a speed increasing direction without interference from the floorboard 46 of the car, sufficient for attaining speeds beyond the governed speed for emergency use such as in passing.

In FIG. 5, the ball 524 cannot rotate with respect to the upper and lower plates 530 because a detent 542 fixed to the lower plate 532 is received in a notch 541 in one side of the ball 524.

I claim:

1. A speed control system for a motor vehicle, said vehicle having an engine and having a fuel flow control member movable in each of two directions for decreasing and increasing flow of fuel to said engine, said vehicle having a drive and wheel assembly comprising wheels supporting said vehicle and transmission means drivably connecting said engine to at least some of said wheels, said vehicle having an accelerator foot pedal movably mounted on said vehicle, said vehicle having constantly urging means thereon constantly urging said pedal and linkage assembly to lower speed positions, movable linkage means connected to said pedal and extending forward to the general area of said engine and with said foot pedal defining a pedal and linkage assembly, said speed control system comprising: a governor system operably connected to the said fuel flow control member and to said pedal and linkage assembly so that said governor system limits the speed of the vehicle to a governed speed set by the governor, said governor system having a governed speed pre-setting means, said governor system being operably connected to said drive and wheel assembly for the operation of said governor system responsive to the factor of the speed of said drive and wheel assembly, and an overcomable high speed deterrent assembly comprising a high resistance spring means, spring means connection means connecting said spring means to said pedal and linkage assembly so that said pedal is urged by said spring means toward lower speed pedal positions at times when the vehicle is exceeding said governed speed, said spring means forming a deterrent force to influence the driver to slow down, and the spring connection means of said high speed deterrent assembly being of a position, size and length so as to be cooperatively correlated with said governor system for safety purposes by permitting vehicle speeds free of the deterrent force of said spring means on the accelerator pedal up to a maximum governor controlled vehicle speed, said governor system and said pedal linkage assembly being so cooperatively correlated with said fuel flow control member that when said governor has moved said fuel flow control member to its general position corresponding to said governed speed while said vehicle travels on substantially level terrain, then said accelerator pedal can still be further moved in a speed increasing direction sufficient for attaining speeds beyond said governed speed for emergency use, such further movement being against the resistance of said spring means, said deterrent spring means being of sufficient force as to make it uncomfortable for the operator to long maintain the foot pedal depressed against this deterrent force, said deterrent force spring means providing a force in excess of the force of said constantly urging means, and in which said governor system has a trackway adjacent to said fuel flow control member, a track follower in said trackway and slidable with respect to said trackway in directions corresponding to each of the two said directions of movement of said fuel flow control member, said governor system having means connecting said track follower and said fuel flow control member, said governor system having pressure means exerting continual pressure on said track follower to urge it in one direction, said governor system having a cable attached to said track follower to urge it in an opposite direction, said movable linkage means being connected to said trackway means, said trackway means being so constructed that at times when said vehicle is travelling at such governed speed said trackway means will prevent said track follower from moving in the direction said track follower is pressed by said pressure means beyond a point of control of said fuel flow control member by said track follower at which point there is still room for said accelerator pedal to move in a speed increasing direction sufficiently for making possible the attaining of speeds beyond said governed speed for emergency use.

2. The speed control system of claim 1 in which a manually controllable governed speed adjusting device is mounted adjacent a driver's position on said vehicle and is operably correlated with said governor means for the manual setting of that vehicle speed which is desired by the driver of the vehicle to be the governed speed, said manually controllable governed speed adjusting device serving to define the said pre-setting means, and in which said pre-setting means is further defined by a pre-setting means located out of reach of a driver in the driver's position and which sets a top limit for the governed speed which cannot be exceeded by operation of said manual speed adjusting device.

3. The speed control system of claim 1 in which two magnetically attracted members are positioned so as to be movable toward and away from each other, means for guiding said magnetically attracted members during such movement, means operably correlating said magnetically attracted members with said spring means so that as said spring means begins to gradually urge said pedal with said deterrent force said magnetically attracted members will move gradually apart for adding a magnetic attraction force to an initial deterrent force of said spring.

4. The speed control system of claim 1 in which said governed speed pre-setting means is permanently fixed in a manner such that it cannot be adjusted by the driver of the vehicle while driving so as to be set for a speed beyond the speed for which it is fixed.

5. The speed control system of claim 1 in which a manually controllable governed speed adjusting device is mounted adjacent a driver's position on said vehicle and is operably correlated with said governor means for the manual setting of that vehicle speed which is desired by the driver of the vehicle to be the governed speed, said manually controllable governed speed adjusting device serving to define the said pre-setting means, said vehicle having a speedometer, said manual setting being done by foot pedal sensing of the beginning of resistance to foot pedal depression by said spring means while adjusting said speed adjusting device and while the operator simultaneously visually monitors his speedometer to correlate the setting of the said speed adjusting device with a desired speed indicated on the speedometer.

* * * * *